(12) United States Patent
Knopf et al.

(10) Patent No.: US 9,019,699 B2
(45) Date of Patent: Apr. 28, 2015

(54) MASS STORAGE DEVICE WITH ELASTOMERIC MATERIAL AND RELATED PORTABLE COMPUTING DEVICE AND METHOD

(75) Inventors: Eric A. Knopf, Mountain View, CA (US); John M. Brock, San Francisco, CA (US); Robert L. Coish, Mountain View, CA (US); Christiaan A. Ligtenberg, San Carlos, CA (US); Ron A. Hopkinson, Campbell, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 13/492,786

(22) Filed: Jun. 8, 2012

(65) Prior Publication Data
US 2013/0329354 A1 Dec. 12, 2013

(51) Int. Cl.
*H05K 5/00* (2006.01)
*H05K 7/00* (2006.01)
*G06F 1/16* (2006.01)
*G06F 1/18* (2006.01)

(52) U.S. Cl.
CPC .............. *G06F 1/1658* (2013.01); *G06F 1/187* (2013.01); *Y10T 29/49021* (2013.01)

(58) Field of Classification Search
USPC ............. 361/679.33, 679.34, 679.35, 679.36, 361/679.37, 679.38, 679.39
See application file for complete search history.

(56) References Cited

U.S. PATENT DOCUMENTS

| | | | |
|---|---|---|---|
| 6,751,092 B1 * | 6/2004 | Ohnishi et al. | 361/679.34 |
| 7,113,398 B2 * | 9/2006 | Oba et al. | 361/679.37 |
| 7,684,181 B2 * | 3/2010 | Peng et al. | 361/679.33 |
| 2006/0181845 A1 * | 8/2006 | Shah et al. | 361/685 |
| 2008/0151421 A1 * | 6/2008 | Asakura et al. | 360/97.02 |
| 2008/0158712 A1 * | 7/2008 | Nakatani | 360/71 |

* cited by examiner

*Primary Examiner* — Anthony Haughton
(74) *Attorney, Agent, or Firm* — Womble Carlyle Sandridge & Rice, LLP

(57) ABSTRACT

Absorbers for a mass storage device are provided. The absorbers may be configured to protect the mass storage device from drop events and reduce the transmission of vibrations from and/or to the mass storage device. Additionally, the absorbers may occupy a smaller amount of space than traditional snubber mounting arrangements. The absorbers may include major surface absorbers formed from a first elastomeric material that engage major surfaces of the mass storage device. Corner absorbers formed from a second elastomeric material may engage the corners of the mass storage device and the side walls of a compartment in a case. The major surface absorbers and the corner absorbers may distribute and absorb load applied during a drop event. A related portable computing device and a related method are also provided.

19 Claims, 16 Drawing Sheets

MASS STORAGE DEVICE WITH ELASTOMERIC MATERIAL AND RELATED PORTABLE COMPUTING DEVICE AND METHOD

TECHNICAL FIELD

The present disclosure relates generally to a mass storage device, and more particularly to a mass storage device with elastomeric material and related portable computing device and method.

BACKGROUND

Mass storage devices are employed in many portable computing devices to store data therein. In the continuing pursuit to improve portable computing devices, manufacturers have attempted to produce portable computing devices having smaller dimensions. In this pursuit, the space allocated for each of the various components therein has been reduced in order to reduce the overall size of the portable computing device.

However, reduction of the space allocated to the mass storage device has presented challenges. In this regard, mass storage devices may fail or temporarily operate improperly when subjected to forces during impacts that exceed a certain level. Accordingly, mass storage devices may be mounted in portable computing devices in manners configured to lessen the forces thereon when subjected to impact. For example, snubbers (rubber bushings) have been employed to mount mass storage devices in portable computing devices. However, embodiments of snubber mounts may use a relatively large amount of space, which may make it difficult to reduce the size of the portable computing device.

Accordingly, improved apparatuses, portable computing devices, and methods for mounting mass storage devices may be desirable.

SUMMARY

A mounting arrangement for a mass storage device such as a hard drive device or a solid state memory device such as flash memory is provided. The mounting arrangement may include major surface absorbers and corner absorbers, which may be respectively formed from first and second elastomeric materials such as foam and rubber. The mass storage device may comprise first and second opposing major surfaces and edges surfaces that define corners. The mass storage device and the absorbers may be configured for insertion into a compartment defined by side walls of a case of a portable computing device.

The major surface absorbers may engage the major surfaces of the mass storage device, for example via adhesive coupling. Further, the corner absorbers may engage the corners of the mass storage device. In one embodiment the corner absorbers may comprise first and second perpendicular walls that may be coupled to the side walls of the compartment. Accordingly, the mass storage device may be inserted into the compartment after the corner absorbers are coupled to the side walls of the compartment in one embodiment. Alternatively, the corner absorbers may comprise a longitudinal wall and end caps configured to engage the corners of the mass storage device, for example via interference fit. Accordingly, the mass storage device may be inserted into the compartment after the corner absorbers are coupled to the mass storage device in another embodiment.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Figure 1:
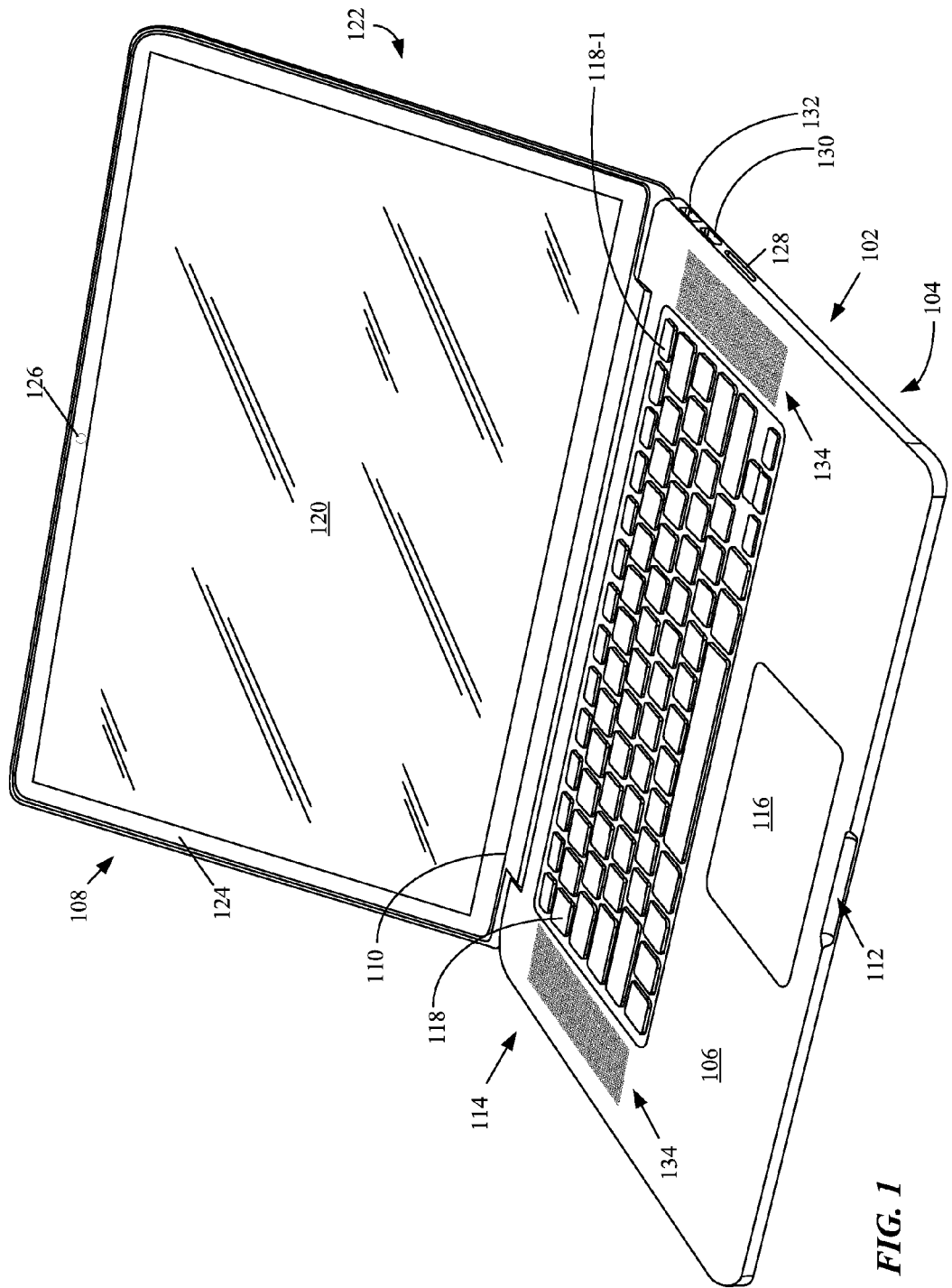
FIG. 1 shows a front facing perspective view of an embodiment of the portable computing device in the form of portable computing device in an open (lid) state according to an example embodiment of the present disclosure.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The top case and the bottom case can each be joined in a particular manner at an interface region such that the gap and offset between top and bottom cases are not only reduced, but are also more consistent from device to device during the mass production of devices. These general subjects are set forth in greater detail below.

In a particular embodiment, the lid and base portion can be pivotally connected with each other by way of what can be referred to as a clutch assembly. The clutch assembly can be arranged to pivotally couple the base portion to the lid. The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

The top case can include a cavity, or lumen, into which a plurality of operational components can be inserted during an assembly operation. In the described embodiment, the operational components can inserted into the lumen and attached to the top case in an "top-bottom" assembly operation in which top most components are inserted first followed by components in a top down arrangement. For example, the top case can be provided and shaped to accommodate a keyboard module. The keyboard module can include a keyboard assembly formed of a plurality of keycap assemblies and associated circuitry, such as a flexible membrane on which can be incorporated a switching matrix and protective feature plate. Therefore, following the top-bottom assembly approach, the keyboard assembly is first inserted into the top case followed by the flexible membrane and then the feature plate that is attached to the top case. Other internal components can then be inserted in a top to bottom (when viewed from the perspective of the finished product) manner.

In one embodiment, the keyboard module can be configured in such a way that a keycap assembly can be used to replace a power switch. For example, in a conventional keyboard each of a top row of keycaps can be assigned at least one function. However, by re-deploying one of the keycaps as a power button, the number of operational components can be reduced by at least eliminating the switch mechanism associated with the conventional power button and replacing it with the already available keycap assembly and associated circuitry.

In addition to the keyboard, the portable computing device can include a touch sensitive device along the lines of a touch pad, touch screen, etc. In those embodiments where the portable computing device includes a touch pad the touch pad can be formed from a glass material. The glass material provides a cosmetic surface and is the primary source of structural rigidity for the touchpad. The use of the glass material in this way significantly reduces the overall thickness of the touchpad compared to previous designs. The touchpad can include circuitry for processing signals from a sensor associated with the touchpad. In one embodiment, the circuitry can be embodied as a printed circuit board (PCB). The PCB can be formed of material and placed in such a way that provides structural support for the touchpad. Thus, a separate touchpad support is eliminated.

In one embodiment, the top case can be formed from a single billet of aluminum that is machined into a desired shape and size. The top case can include an integrated support system that adds to the structural integrity of the top case. The integrated support system can be continuous in nature in that there are no gaps or breaks. The integrated support system can be used to provide support for individual components (such as a keyboard). For example, the integrated support system can take the form of ribs that can be used as a reference datum for a keyboard. The ribs can also provide additional structural support due to the added thickness of the ribs. The ribs can also be used as part of a shield that help to prevent light leaking from the keyboard as well as act as a Faraday cage that prevents leakage of extraneous electromagnetic radiation.

The continuous nature of the integrated support system can result in a more even distribution of an external load applied to the multi-part housing resulting in a reduced likelihood of warping, or bowing that reduces risk to internal components. The integrated support system can also provide mounting structures for those internal components mounted to the multi-part housing. Such internal components include a mass storage device (that can take the form of a hard disk drive, HDD, or solid state drive, SSD), audio components (audio jack, microphone, speakers, etc.) as well as input/output devices such as a keyboard and touch pad.

These and other embodiments are discussed below with reference to FIGS. 1-16. However, those skilled in the art will readily appreciate that the detailed description given herein with respect to these figures is for explanatory purposes as the invention extends beyond these limited embodiments.

FIGS. 1-16 show various views of the portable computing device in accordance with various embodiments. FIG. 1 shows a front facing perspective view of an embodiment of the portable computing device in the form of portable computing device 100 in an open (lid) state. Portable computing device 100 can include base portion 102 formed of bottom case 104 fastened to top case 106. Base portion 102 can be pivotally connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad 116. Keyboard 114 can include a plurality of low profile keycap assemblies each having an associated key pad 118. In one embodiment, an audio transducer (not shown) can use selected portions of keyboard 114 to output audio signals such as music. In the described embodiment, a microphone can be located at a side portion of top case 106 that can be spaced apart to improve frequency response of an associated audio circuit.

Each of the plurality of key pads 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of portable computing device 100. In order to reduce component count, a keycap assembly can be re-provisioned as a power button. For example, key pad 118-1 can be used as power button 118-1. In this way, the overall number of components in portable computing device 100 can be commensurably reduced.

Touch pad 116 can be configured to receive finger gesturing. A finger gesture can include touch events from more than one finger applied in unison. The gesture can also include a single finger touch event such as a swipe or a tap. The gesture can be sensed by a sensing circuit in touch pad 116 and converted to electrical signals that are passed to a processing unit for evaluation. In this way, portable computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120.

Display 120 can display visual content such as a graphical user interface, still images such as photos as well as video media items such as movies. Display 120 can display images using any appropriate technology such as a liquid crystal display (LCD), OLED, etc. Portable computing device 100 can also include image capture device 126 located on a transparent portion of display trim 124. Image capture device 126 can be configured to capture both still and video images. Lid portion 108 can be formed to have uni-body construction that can provide additional strength and resiliency to lid portion 108 which is particularly important due to the stresses caused by repeated opening and closing. In addition to the increase in strength and resiliency, the uni-body construction of lid portion 108 can reduce overall part count by eliminating separate support features.

Data ports 128-132 can be used to transfer data and/or power between an external circuit(s) and portable computing device 100. Data ports 128-132 can include, for example, input slot 128 that can be used to accept a memory card (such as a FLASH memory card), data ports 130 and 132 can take be used to accommodate data connections such as USB, FireWire, Thunderbolt, and so on. In some embodiments, speaker grid 134 can be used to port audio from an associated audio component enclosed within base portion 102.

Figure 2:
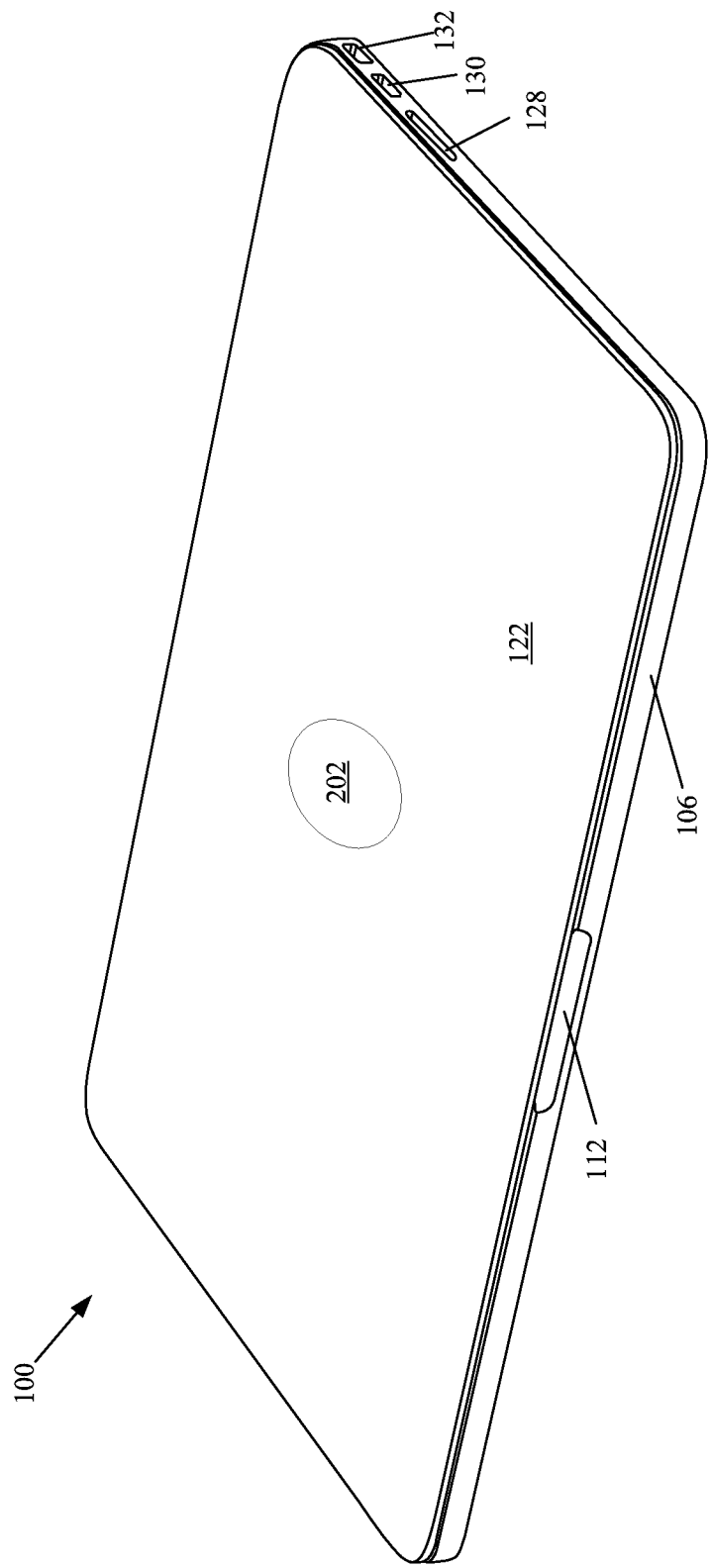
FIG. 2 shows the portable computing device of FIG. 1 in a closed (lid) configuration that shows rear cover and logo according to an example embodiment of the present disclosure.

FIG. 2 shows the portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3:
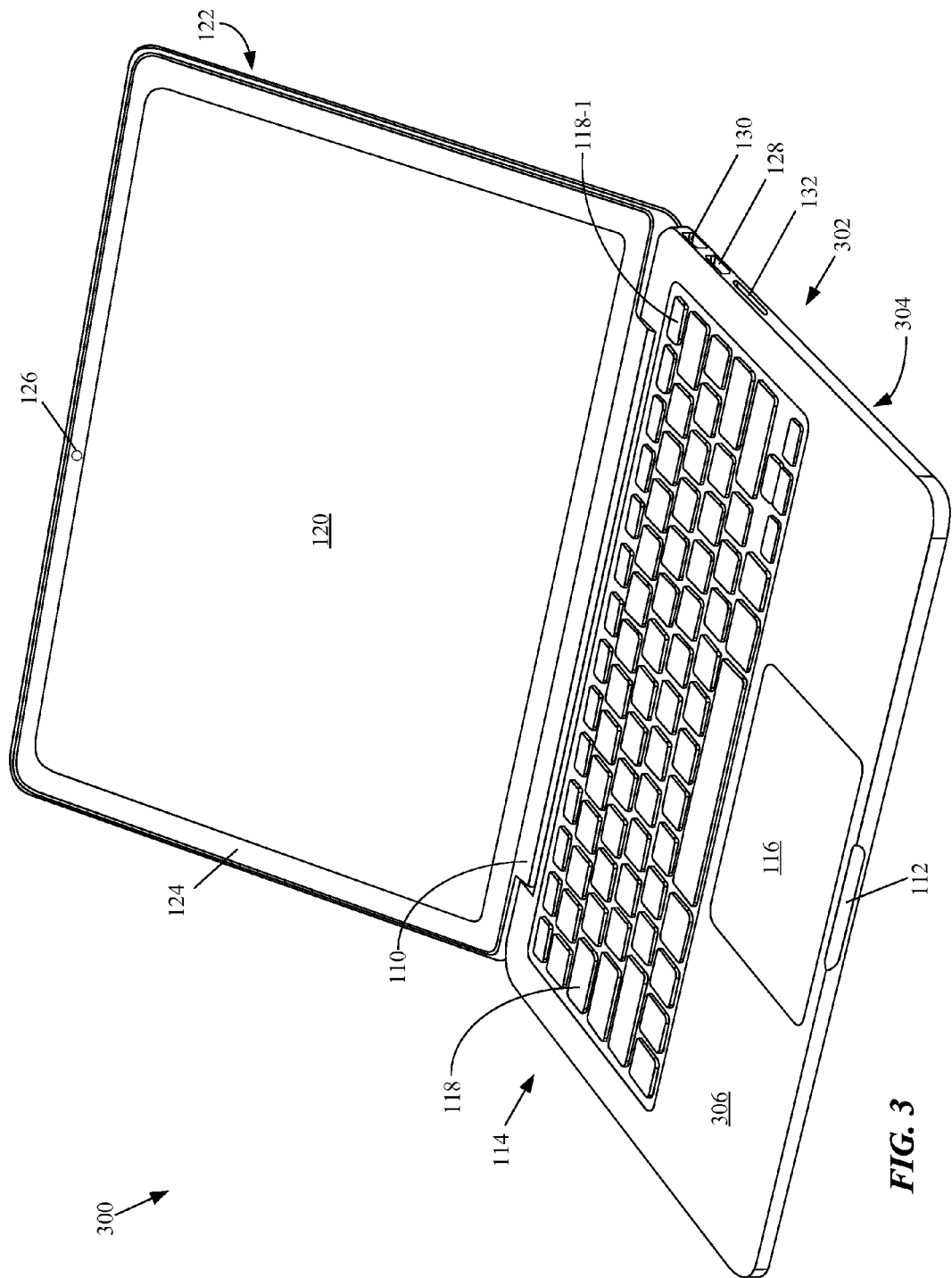
FIG. 3 shows another embodiment of the portable computing device in an open state according to an example embodiment of the present disclosure.

FIG. 3 shows another embodiment in the form of portable computing device 300 that is smaller than portable computing device 100. Since portable computing device 300 is smaller in size than portable computing device 100, certain features shown in FIG. 1 are modified, or in some cases lacking, in portable computing device 300. For example, base portion 302 can be reduced in size such that separate speakers (such as speaker grid 134) are replaced with an audio port embodied as part of keyboard 114. However, bottom case 304 and top case 306 can retain many of the features described with regards to portable computing device 100 (such as display 120 though reduced to an appropriate size).

Figure 4:
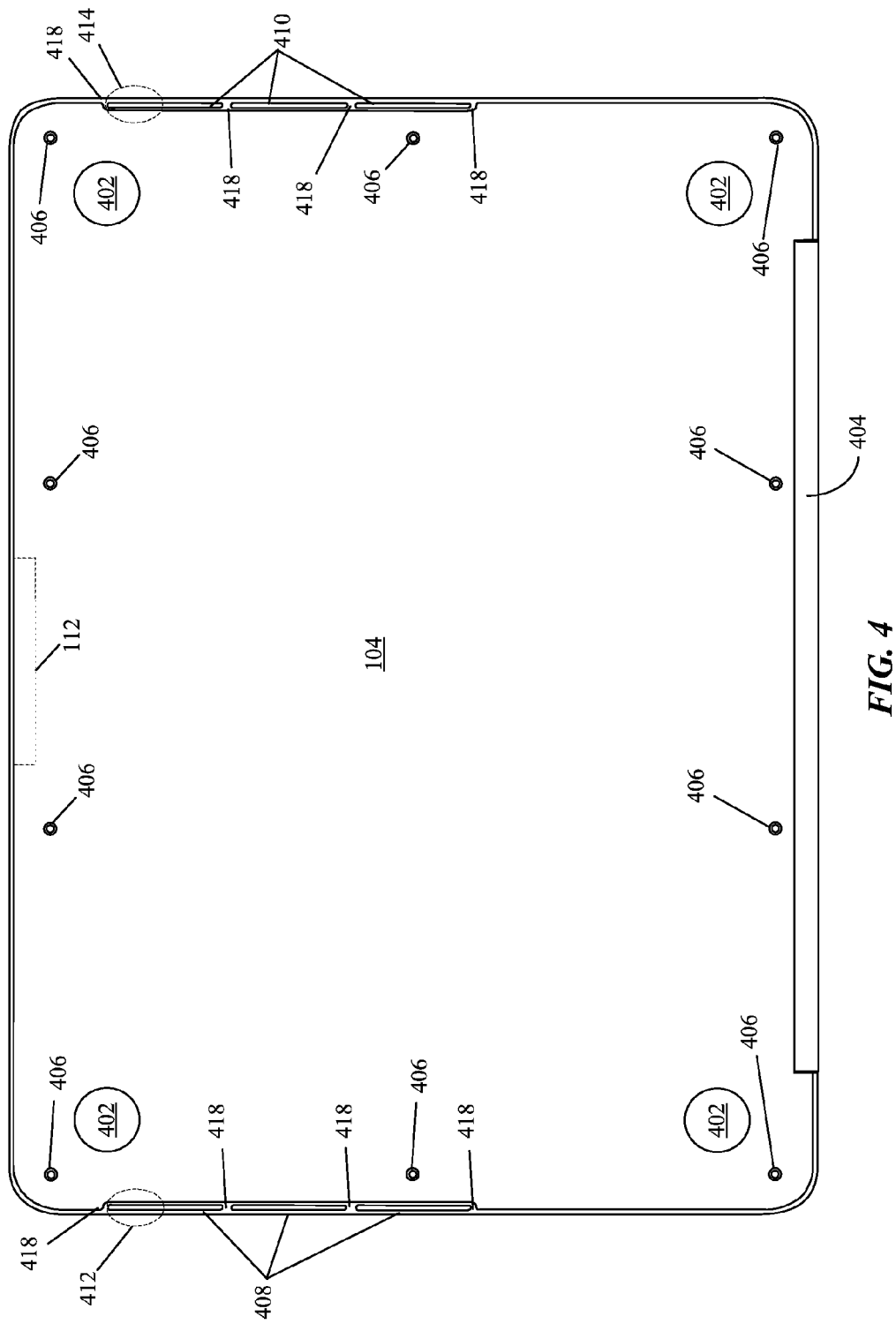
FIG. 4 shows an external view of the bottom case of the portable computing device of FIG. 1 or 3 according to an example embodiment of the present disclosure.

FIG. 4 shows an external view of bottom case 104 showing relative positioning of support feet 402, insert 112, cosmetic wall 404 that can be used to conceal clutch assembly 110 and fasteners 406 used to secure bottom case 104 and top case 106 together. Support feet 402 can be formed of wear resistant and resilient material such as plastic. Also in view are multi-purpose front side sequentially placed vents 408 and 410 that can be used to provide a flow of outside air that can be used to cool internal components. In the described embodiment, vents 408 and 410 can be placed on an underside of top cover 106 in order to hide the vents from view as well as obscure the view of an interior of portable computing device 100 from the outside. Vents 408 and 410 can act as a secondary air intake subordinate to primary air intake vents located at a rear portion of portable computing device 100 (described below). In this way, vents 408 and 410 can help to maintain an adequate supply of cool air in those situations where portions of the rear vents are blocked or otherwise have their air intake restricted.

Vents 408 and 410 can also be used to output audio signals in the form of sound generated by an audio module (not shown). In one embodiment, a selected portion (such as portions 412 and 414) can be used to output sound at a selected frequency range in order to improve quality of an audio presentation by portable computing device 100. Vents 408 and 410 can be part of an integrated support system in that vents 408 and 410 can be machined from the outside and cut from the inside during fabrication of top case 106.

Moreover, trusses 418 can be formed between vents 408 and 410 in combination with ribs 416 can add both structural support as well as assist in defining both the cadence and size of vents 408 and 410. The cadence and size of vents 408 and 410 can be used to control air flow into portable computing device 100 as well as emission of RF energy in the form of EMI from portable computing device 100. Accordingly, stiffener ribs 416 can separate an area within vents 408 and 410 to produce an aperture sized to prevent passage of RF energy. As well known in the art, the size of an aperture can restrict the emission of RF energy having a wavelength that can be "trapped" by the aperture. In this case, the size of vents 408 and 410 is such that a substantial portion of RF energy emitted by internal components can be trapped within portable computing device 100. Furthermore, by placing vents 408 and 410 at a downward facing surface of top case 106, the aesthetics of portable computing device 100 can be enhanced since views of internal components from an external observer are eliminated.

The portable computing devices 100, 300 described above and other embodiments of portable computing devices may employ mass storage devices to store data therein. Example embodiments of mass storage devices include hard drives and solid state storage devices such as flash memory devices. The operation of mass storage devices may be affected when subjected to relatively high forces, such as those that may occur during impacts. For example, when a portable computing device is subjected to a drop event, the mass storage may be damaged or temporarily become inoperable. Accordingly, it may be undesirable to directly mount a rigid structure of the mass storage device to a rigid structure of the portable computing device (e.g., an internal frame therein).

Figure 5:
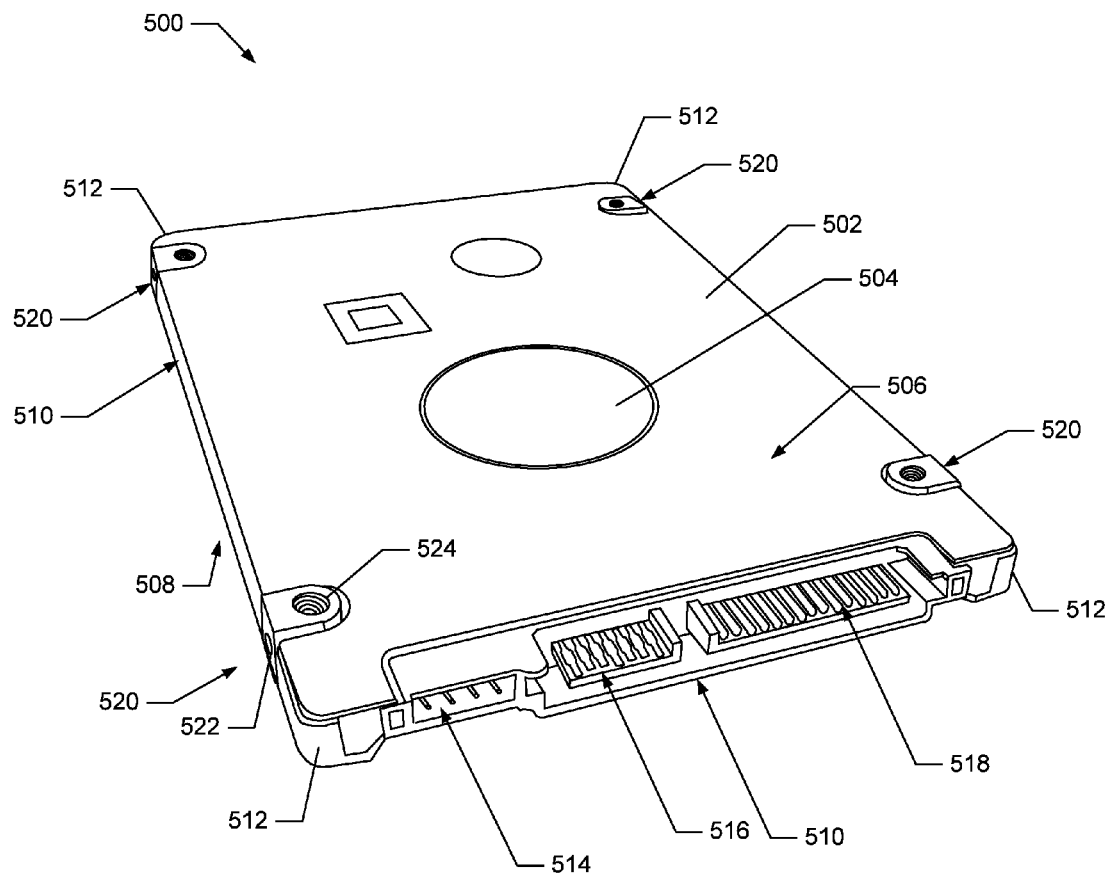
FIG. 5 illustrates a mass storage device, and more particularly a hard drive device.

FIG. 5 illustrates an example embodiment of a hard drive device 500 that may be included in the portable computing device. In particular, FIG. 5 illustrates a 2.5 inch hard drive device, although the portable computing device may employ various other sizes and shapes of mass storage devices in other embodiments. As illustrated, the hard drive device 500 includes an outer casing 502 through which a spindle 504 extends. The hard drive device 500 may comprise a first major surface 506 and an opposing second major surface 508. A plurality of edge surfaces 510 may define a plurality of corners 512. Various connectors may be provided at one or more of the edge surfaces 510 of the hard drive device 500. The connectors may include a power connector 514, a jumper block 516, and an integrated drive electronics (IDE) connector 518 in some embodiments.

Further, the hard drive device 500 may include a plurality of attachment structures 520. As illustrated, the attachment structures 520 may be provided proximate the corners 512 of the hard drive device 500. Each attachment structure 520 may include a horizontal mounting point 522 and a vertical mounting point 524, which may be respectively configured to receive a threaded fastener therein in order to mount the hard drive device 500 to the portable computing device.

Figure 6:
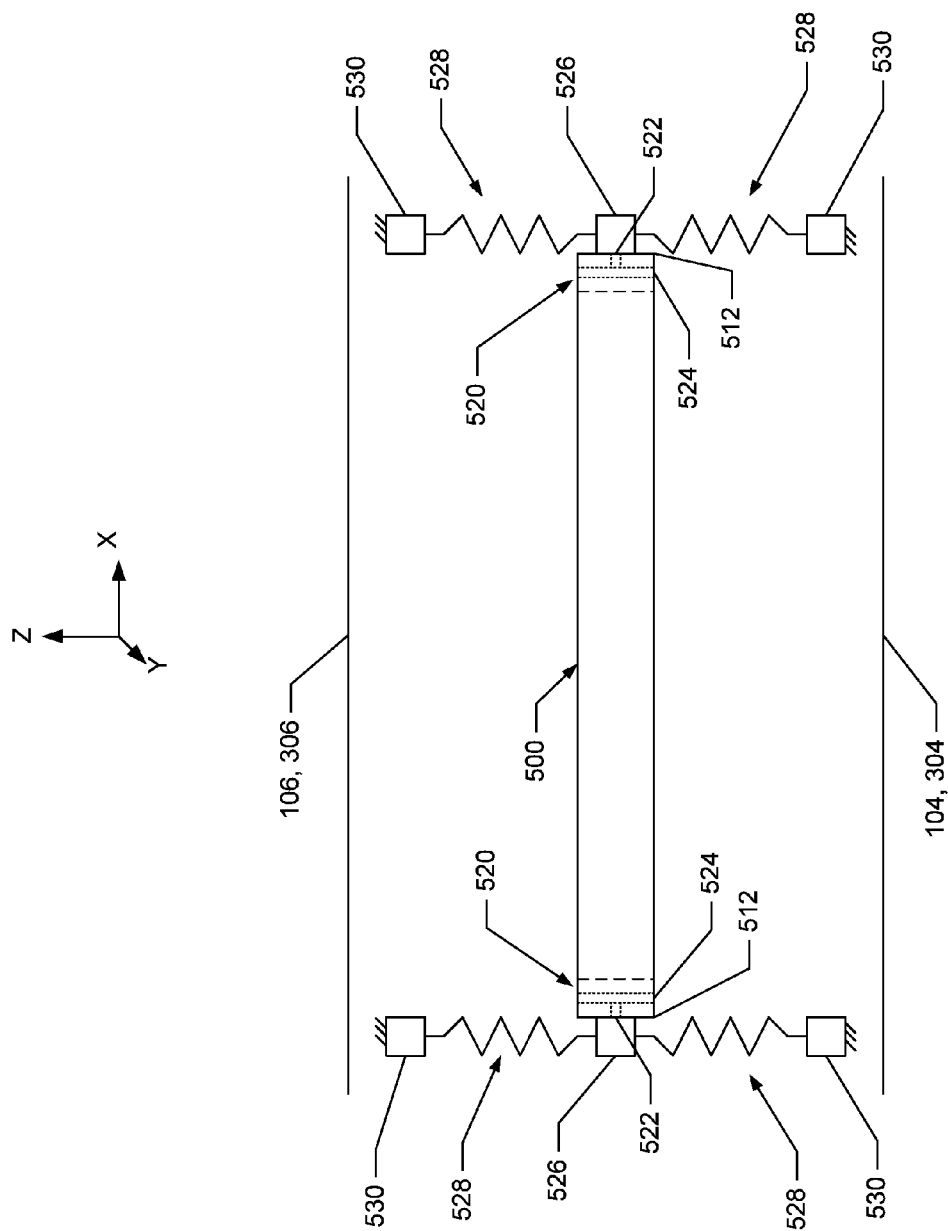
FIG. 6 schematically illustrates a mounting arrangement for the hard drive device of FIG. 5 employing snubbers.

In this regard, an example mounting arrangement for the hard drive device 500 that employs the attachment structures 520 is schematically illustrated in FIG. 6. As illustrated, the mounting arrangement may employ couplers 526 to attach to the mounting points 520. Snubbers 528, typically embodied as rubber bushings, may be attached to the couplers 526 at one end and stationary attachment structures 530 which may be hard mounted with the portable computing device. Accordingly, during a drop event, the snubbers 528 may allow the hard drive device 500 to move relative to the couplers 526 and the remainder of the portable computing device such that the force transferred to the hard drive device may be spread out over a longer period of time and thereby the impulse applied to the hard drive device may be reduced in comparison to a mounting arrangement in which the hard drive device is directly coupled to a rigid structure within the portable computing device.

However, the mounting arrangement illustrated in FIG. 6 may suffer from several deficiencies. In this regard, the mounting structure may require a relatively large amount of space. As illustrated, by employing the horizontal mounting points 522 on the attachment structures 520, the mounting arrangement may occupy a relatively larger amount of space along an X-axis. Although use of the vertical mounting points 524 may decrease the width of the mounting arrangement along the X-axis, the couplers 526 may be shifted vertically in such an arrangement, thereby increasing the vertical height of the mounting arrangement along a Z-axis.

Further, regardless of whether the horizontal or vertical mounting points 522, 524 are employed, the vertical height of the mounting arrangement along the Z-axis may be relatively large due to employing snubbers 528 on both the top and bottom of the hard drive device 500. Additionally, as illustrated, the snubbers 528 may not be mounted directly to a top case 106, 306 or a bottom case 104, 304 of the portable computing device, which may further increase the height of the mounting arrangement along the Z-axis.

Also, by mounting the hard drive device 500 at the corners 512 thereof (e.g., by using the attachment structures 520 mounted at the corners), the hard drive device may tend to flex and act like a diaphragm when subjected to an impact or vibrations. Thus, the forces to which the hard drive device 500 is subjected, particularly at the center thereof, may be amplified by the flexing of the hard drive device when mounted only at the corners thereof.

Additionally, the snubbers 528 may transmit vibrations out from the hard drive device 500 through the stationary attachment structures 530, or other components may transmit vibrations through the stationary attachment structures and the snubbers to the hard drive device. In this regard, although solid state memory devices may be relatively more durable than hard drive devices, it may still be desirable to avoid hard mounting a solid state memory device to a rigid component of a portable computing device because some embodiments of mass storage devices may be adversely affected when subjected to certain vibrations that may be transmitted thereto. Conversely, mass storage devices employing moving parts (e.g., hard drive devices) may transmit vibrations outwardly therefrom, which may adversely affect other components of the portable computing device.

Accordingly, embodiments of the present disclosure provide apparatuses configured to avoid the above-noted problems. Note that the description provided herein is made by way of reference to the hard drive device 500 illustrated in FIG. 5. However, the disclosure is also applicable to other embodiments of mass storage devices, as noted above.

Figure 7A:
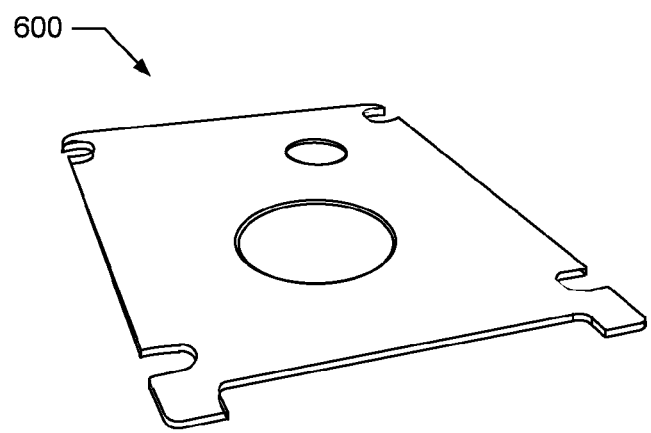
FIG. 7A illustrates a top major surface absorber comprising a first elastomeric material according to an example embodiment of the present disclosure.
Figure 7B:
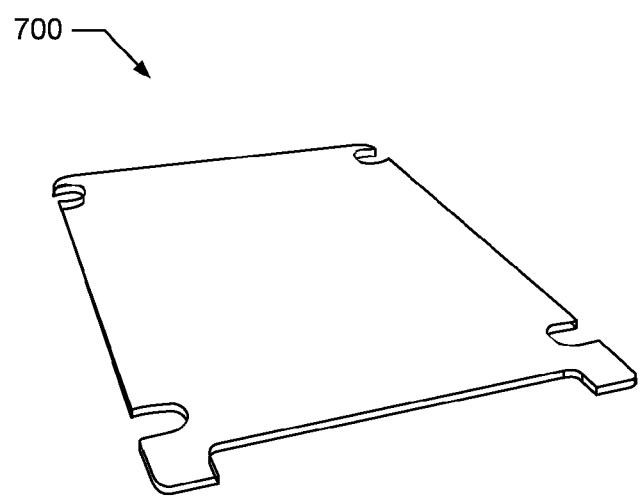
FIG. 7B illustrates a bottom major surface absorber comprising the first elastomeric material according to an example embodiment of the present disclosure.

In this regard, FIGS. 3A and 3B illustrate absorbers that may be employed in mounting arrangements according to embodiments of the present disclosure. In this regard, FIG. 7A illustrates an embodiment of a major surface absorber 600 configured to engage the first major surface 506 of the hard drive device 500, and FIG. 7B illustrates a major surface absorber 700 configured to engage the second major surface 508 of the mass storage device. As illustrated, the major surface absorbers 600, 700 may be configured to substantially conform to the shape of the hard drive device 500 at the major surfaces 506, 508 and include cutouts for the spindle 504, attachment structures 520, and or other features thereof. Thereby, the major surface absorbers 600, 700 may define substantially planar surfaces while avoiding contact with any moving parts of the hard drive device 500. The major surface absorbers 600, 700 may be formed from various embodiments of a first elastomeric material. For example in one embodiment the major surface absorbers 600, 700 may comprise foam (e.g., open cell foam or closed cell foam) or rubber.

Additional absorbers that may be employed in mounting arrangements according to embodiments of the present disclosure are illustrated in FIGS. 4A and 4B. More particularly, FIGS. 4A and 4B illustrate embodiments of corner absorbers 800, 900 configured to engage the corners 512 of the hard drive device 500. The corner absorbers 800, 900 may be formed from various embodiments of a second elastomeric material, which may be the same as or different from the first elastomeric material. For example in one embodiment the corner absorbers 800, 900 may comprise foam (e.g., open cell foam or closed cell foam) or rubber.

Figure 8A:
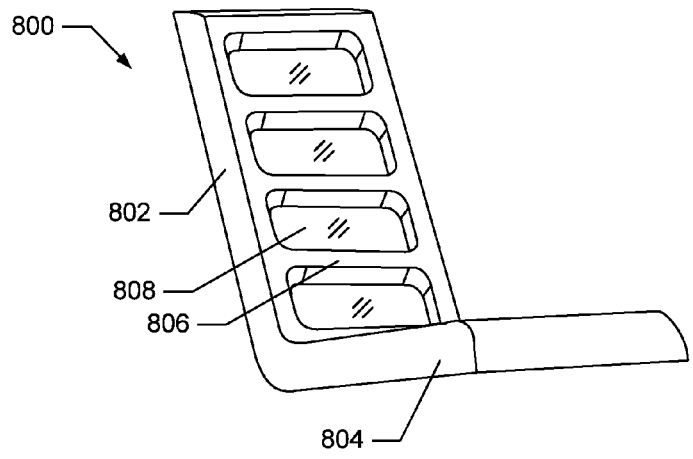
FIG. 8A illustrates a corner absorber comprising perpendicular walls according to a first example embodiment of the present disclosure.

The corner absorber 800 illustrated in FIG. 8A is configured to engage a corner 512 of the hard drive device 500 and extend a relatively short distance along the edge surfaces 510 that define the corner. Thus, four of the corner absorbers 800 may be employed to engage each of the four corners 512 of the hard drive device 500.

The corner absorber 800 illustrated in FIG. 8A may comprise first and second walls 802, 804 that extend substantially perpendicularly from one another. As illustrated, in some embodiments the corner absorber 800 may include a plurality of ridges 806 and recesses 808 that are configured to extend perpendicularly from the hard drive device 500 when the corner absorber is engaged therewith.

Figure 8B:
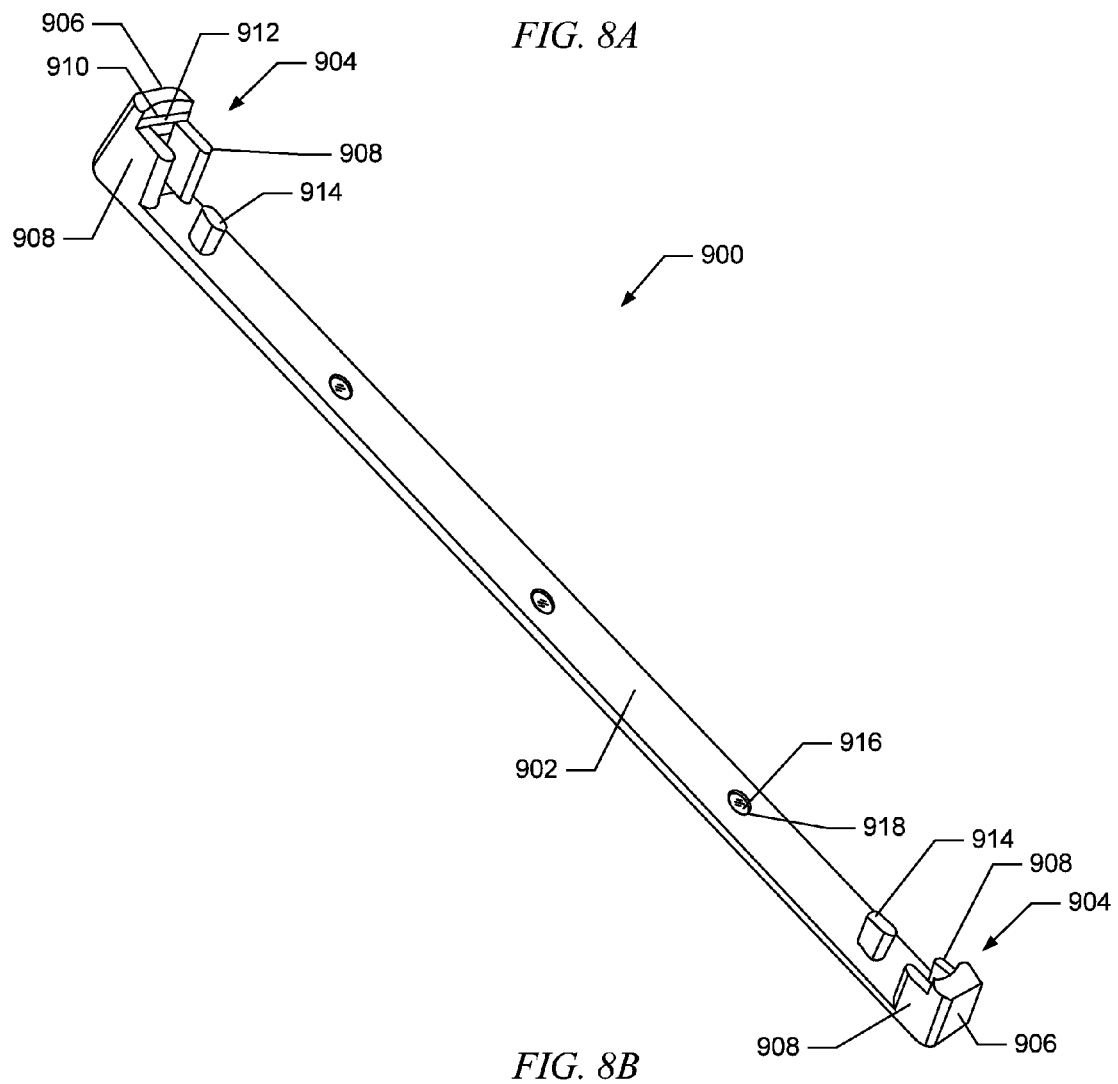
FIG. 8B illustrates a corner absorber comprising a longitudinal wall and end caps according to a second example embodiment of the present disclosure.

In contrast to the corner absorber 800 illustrated in FIG. 8A, the corner absorber 900 illustrated in FIG. 8B is configured to extend between two corners 512 of the hard drive device 500 and the edge surface 510 therebetween. Accordingly, two of the corner absorbers 900 may be employed to engage each of the four corners 512 of the hard drive device 500. In embodiments of the hard drive device 500 that are rectangular, the corner absorbers 900 may extend along either the shorter, or the longer pair of the edge surfaces 510 thereon, depending on the position of the connectors on the hard drive device.

As illustrated, in some embodiments the corner absorber 900 may include a longitudinal wall 902 and opposing end caps 904. The end caps 904 may each include an end wall 906 and two side walls 908 that are configured to collectively surround a corner 512 of the hard drive device 500. Further, the corner absorber 900 may include a plurality of ridges 910 and recesses 912 that are configured to extend perpendicularly from the hard drive device 500 when the corner absorbers are coupled thereto. In some embodiments the ridges 910 and recesses 912 may be provided only at the end caps 904, whereas in other embodiments the ridges and recesses may additionally or alternatively be provided along the length of the longitudinal wall 902. Additionally, protrusions 914 may extend perpendicularly from the longitudinal wall 902 in the same direction that the opposing end caps 904 extend therefrom.

Figure 9:
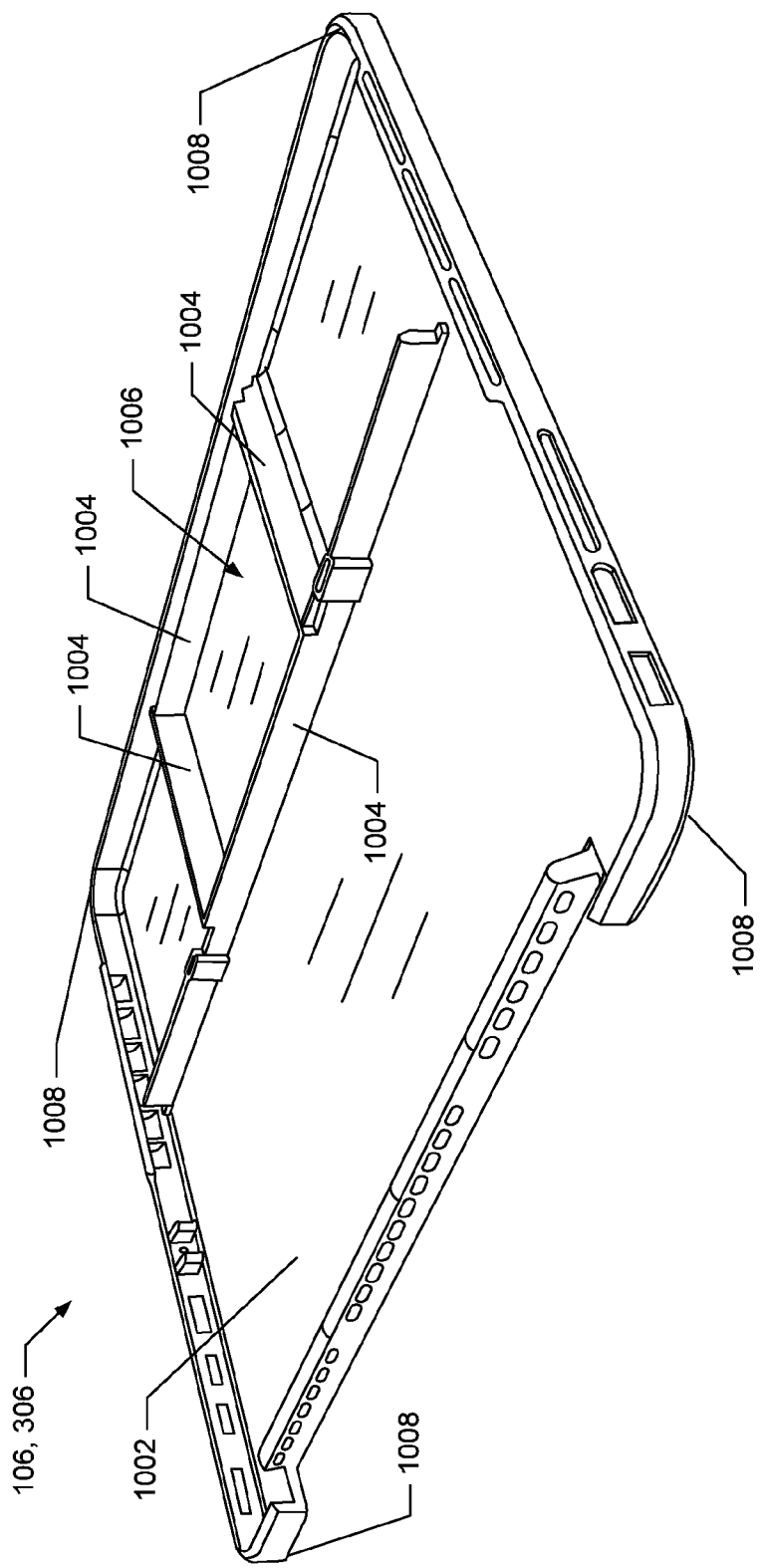
FIG. 9 illustrates a top case comprising a major surface and a plurality of side walls that define a compartment according to an example embodiment of the present disclosure.

FIG. 9 illustrates an embodiment of a case, and more particularly the top case 106, 306 of the portable computing device. As illustrated, the top case 106, 306 may comprise a major wall 1002 and a plurality of side walls 1004 that define a compartment 1006. For example, in one embodiment the major wall 1002 and the side walls 1004 defining the compartment 1006 may define integral portions of the top case 106, 306. The compartment 1006 may be configured to receive the hard drive device 500 and absorbers 600, 700, 800, 900 therefor.

Figure 10:
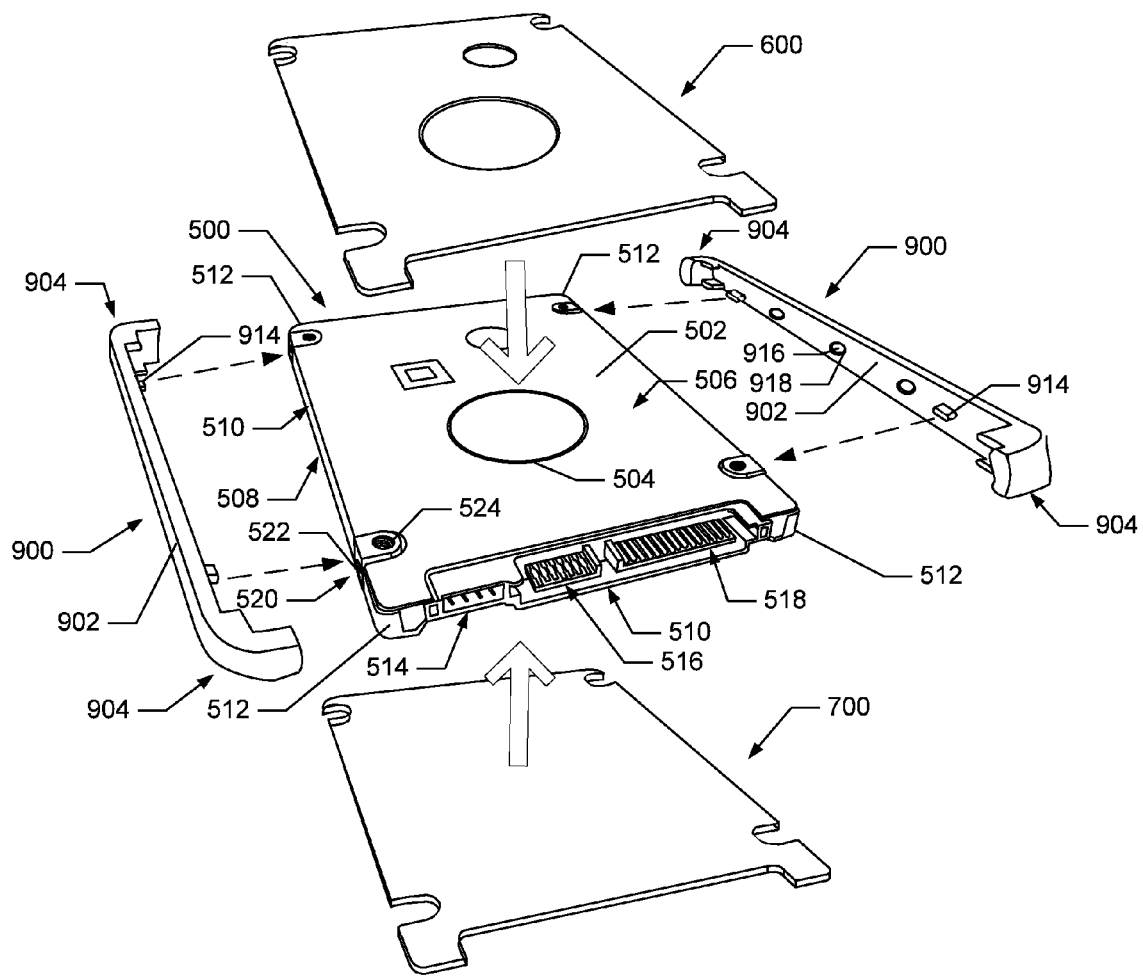
FIG. 10 illustrates operations performed in coupling the major surface absorbers and the second embodiment of the corner features to the hard drive device of FIG. 1 according to an example embodiment of the present disclosure.

In this regard, FIG. 10 illustrates one embodiment of the operations performed in preparing the hard drive device 500 for insertion into the compartment 1006 in the top case 106, 306. In particular, FIG. 10 illustrates the operations performed in preparing the hard drive device 500 for insertion into the compartment 1006 in the top case 106, 306 with the major surface absorbers 600, 700 and the corner absorbers 900 illustrated in FIG. 8B. As illustrated, the major surface absorbers 600, 700 may be coupled to the first and second major surfaces 506, 508 of the hard drive device 500, for example via adhesive coupling.

Further, the corner absorbers 900 illustrated in FIG. 8B may be coupled to the hard drive device 500. In this regard, the longitudinal walls 902 of the corner absorbers 900 may be brought into contact with the edge surfaces 510 of the hard drive device 500 such that the protrusions 914 engage the horizontal mounting points 522 of the attachment structures 520. Further, the end caps 904 may engage the corners 512 of the hard drive device 500 as the corner absorbers 900 are coupled to the hard drive device.

Thus, in some embodiments the corner absorbers 900 may be mechanically coupled to the hard drive device 500, although adhesive may be additionally or alternatively employed. In particular, the protrusions 914 may engage the horizontal mounting points 522 via interference fit. Further, the end caps 904 may engage the corners 512 of the hard drive device 500 via interference fit. The ridges 910 and recesses 912 (see, e.g., FIG. 8B) may assist in providing the interference fit.

Figure 11:
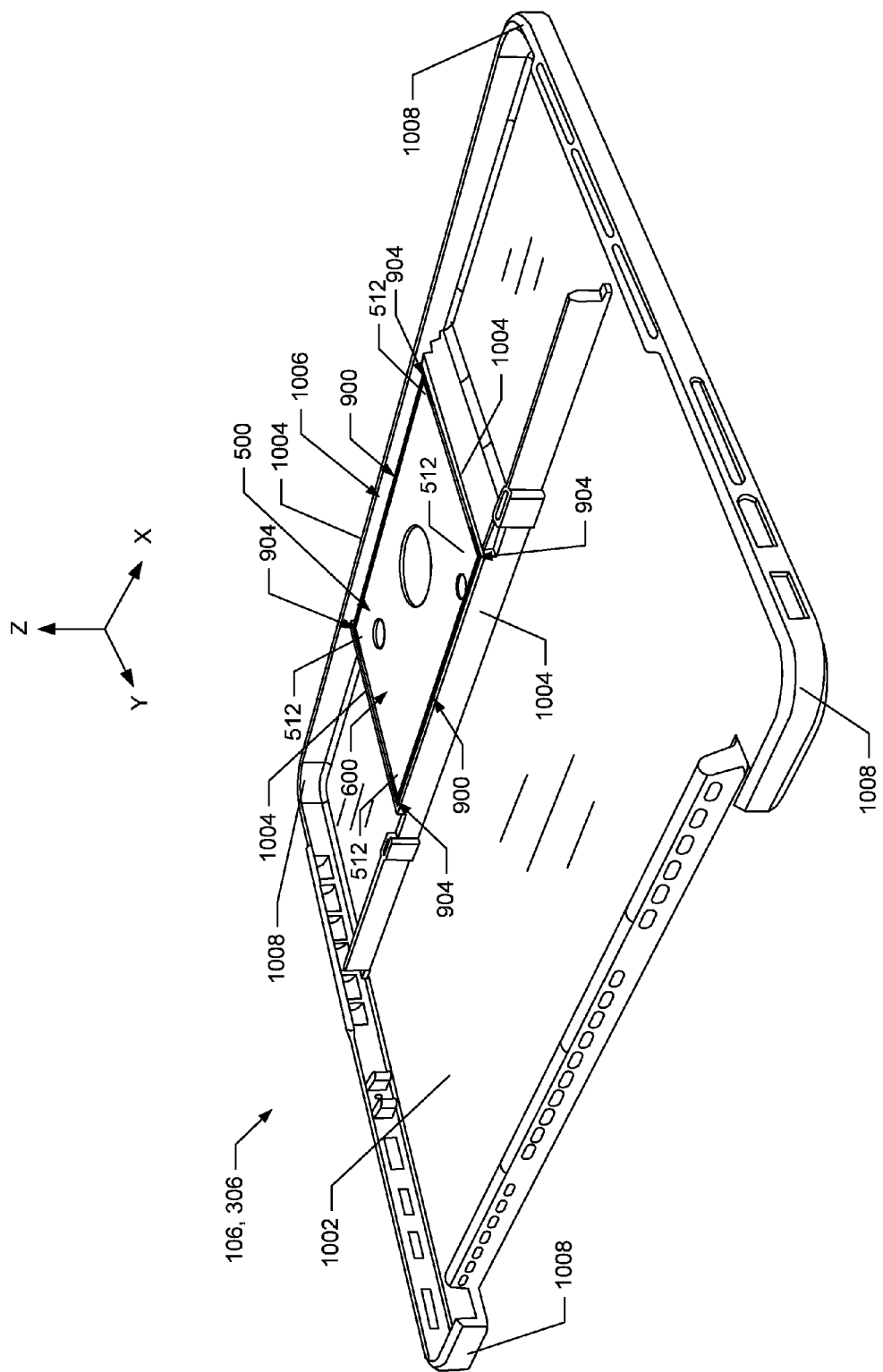
FIG. 11 illustrates the hard drive disk and the absorbers of FIG. 10 after insertion in the compartment of the top case of FIG. 9 according to an example embodiment of the present disclosure.

Accordingly, the corner absorbers 900 and the major surface absorbers 600, 700 may be coupled to the hard drive device 500, and the entire assembly may be inserted into the compartment 1006 as illustrated in FIG. 11. In some embodiments the side walls 1004 defining the compartment 1006 may be coated with a primer or a lubricant that assists in allowing for insertion of the assembly into the compartment. Further, in some embodiments the corner absorbers 900 may be reinforced by a metal band 916, which may be visible in some embodiments through apertures 918, which may be formed during molding the corner absorbers from the second elastomeric material (see, e.g., FIGS. 4B and 6). The metal band 916 may provide the corner absorbers 900 with a degree of rigidity that may help maintain the shape of the corner absorbers and thereby assist in maintaining the coupling between the corner absorbers and the corners 512 of the hard drive device 500 during and after insertion into the compartment 1006. Note that in some embodiments the corner absorbers 900 may be compressed during insertion of the hard drive device 500, which may preload the second elastomeric material.

Figure 12:
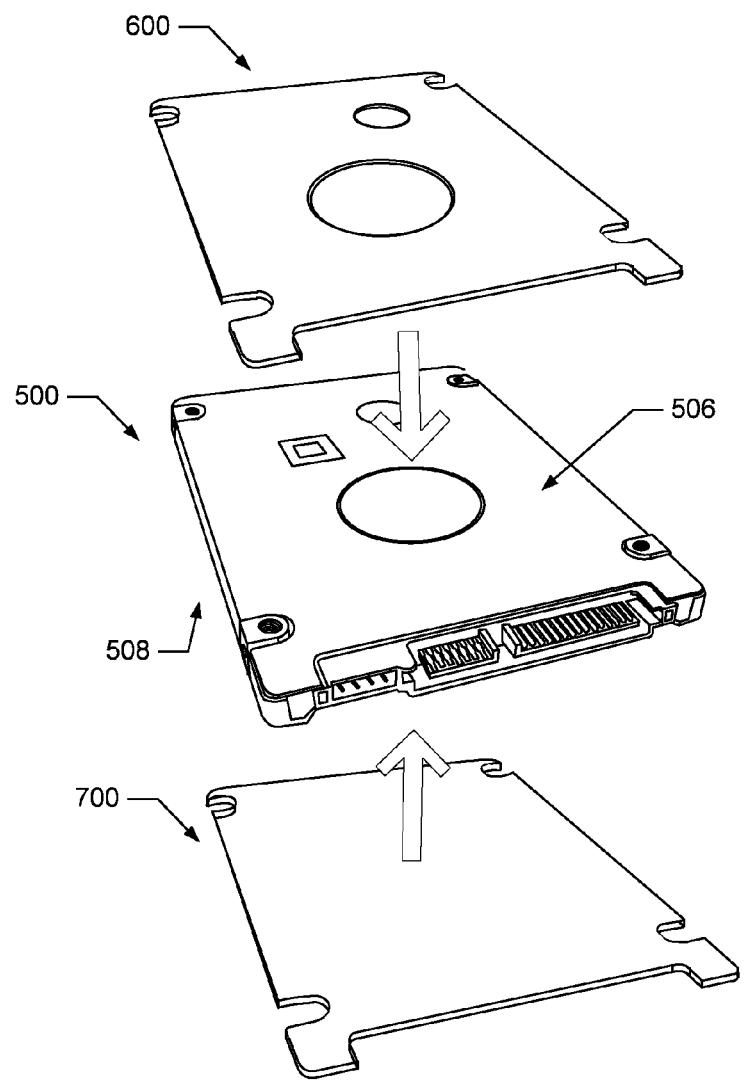
FIG. 12 illustrates the operations performed in coupling the major surface absorbers to the hard drive device of FIG. 5 according to an example embodiment of the present disclosure.

The operations performed in preparing the hard drive device 500 for insertion into the compartment 1006 in the top case 106, 306 with the major surface absorbers 600, 700 and the corner absorbers 800 illustrated in FIG. 8A are similar in that they may involve coupling the major surface absorbers 600, 700 to the first and second major surfaces 506, 508 of the hard drive device 500, for example via adhesive coupling, as illustrated in FIG. 12. However, the operations may differ in other respects.

Figure 13:
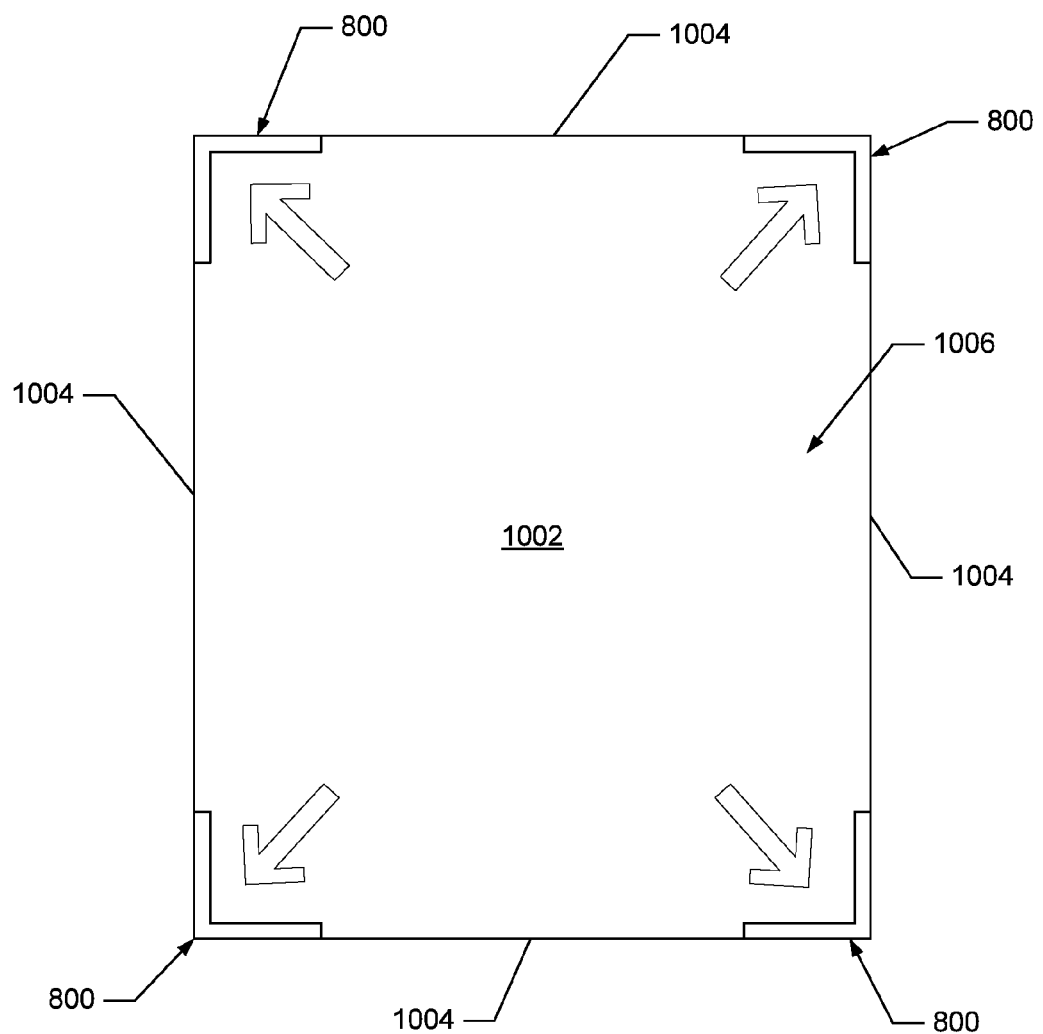
FIG. 13 illustrates the operations performed in coupling the first embodiment of the corner absorbers to the side walls defining the compartment of the tray of FIG. 9 according to an example embodiment of the present disclosure.
Figure 14:
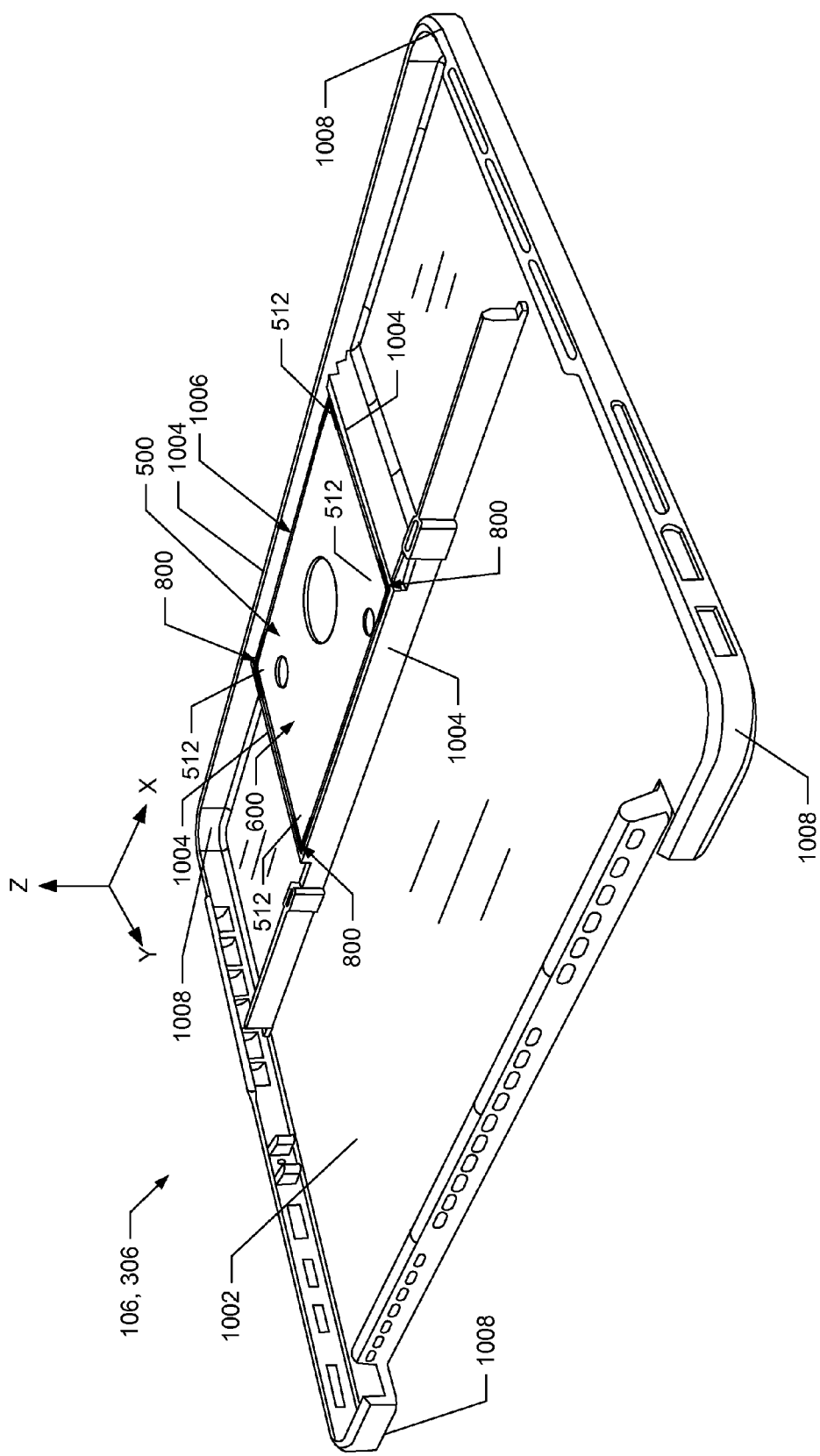
FIG. 14 illustrates the hard drive disk and the absorbers of FIGS. 12 and 13 after insertion in the compartment of the top case of FIG. 9 according to an example embodiment of the present disclosure.

In this regard, as illustrated in FIG. 13, the corner absorbers 800 may be coupled to the side walls 1004 of the top case 106, 306 that form the compartment 1006 prior to inserting the hard drive device 500 therein. For example, the corner absorbers 800 may be adhesively coupled to the side walls 1004 of the compartment 1006. Thereafter, as illustrated in FIG. 14, the hard drive device 500 may be inserted into the compartment 1006 with the corner absorbers 800 positioned between the corners 512 of the hard drive device and the side walls 1004 defining the compartment. Accordingly, in embodiments employing the corner absorbers 800 illustrated in FIG. 8A, the hard drive device 500 may be engaged with, but decoupled from, the corner absorbers. This differs from the embodiment of the corner absorbers 900 illustrated in FIG. 8B, which couple to the corners 512 of the hard drive device 500 and engage the side walls 1004 of the compartment, but are decoupled therefrom. Note that in some embodiments the corner absorbers 800 may be compressed during insertion of the hard drive device 500, which may preload the second elastomeric material.

Regardless of the particular embodiment of corner absorbers 800, 900 employed, the corner absorbers may provide a degree of compliance along the Z-axis due to the decoupling between either the corner absorbers and the hard drive device 500 (e.g., when employing the corner absorbers 800 illustrated in FIG. 8A) or between the corner absorbers and the side walls 1004 defining the compartment (e.g., when employing the corner absorbers 800 illustrated in FIG. 8B).

Figure 15:
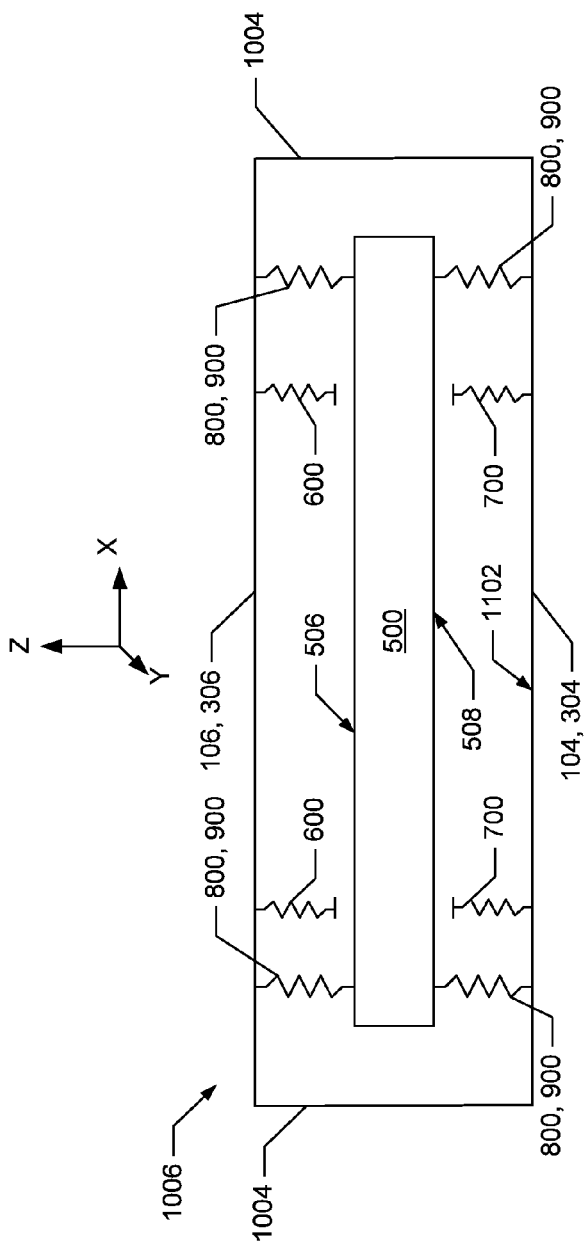
FIG. 15 schematically illustrates a mounting arrangement for the hard drive device of FIG. 5 employing the major surface absorbers of FIGS. 7A and 7B and the corner absorbers of FIG. 8A or 8B according to an example embodiment of the present disclosure.

In this regard, FIG. 15 schematically illustrates a view of the absorbers at the compartment 1006 as they relate to movement along the Z-axis. As illustrated, in one embodiment the hard drive device 500 may be engaged with the corner absorbers 800, 900 such that any movement along the Z-axis is resisted by the corner absorbers 800, 900. However, due to the corner absorbers 800, 900 being coupled to only one of the hard drive device 500 and the side walls 1004 of the compartment in some embodiments, the spring force resisting movement may be relatively weak. This weak spring effect may be employed as a low pass filter configured to reduce noise transmitted from or to the hard drive device 500.

The major surface absorbers 600, 700 may be initially disengaged from the hard drive device 500 in a neutral configuration, as illustrated. In this regard, in some embodiments the major surface absorbers 600, 700 may be coupled to the top case 106, 306 and a second case (e.g. a rear case 104, 304), with gaps provided between the major surface absorbers and the hard drive device 500. Alternatively, as described above the major surface absorbers 600, 700 may be coupled to the first major surface 506 and the second major surface 508 of the hard drive device 500 such that the gaps are positioned between the major surface absorbers and the first major surface 1002 of the top case 106, 306 and a second major surface 1102 of the bottom case 104, 304. Thereby, the major surface absorbers 600, 700 may substantially avoid transferring vibration from or to the hard drive device 500. However, during a drop event along the Z-axis, the major surface absorbers 600, 700 may come into contact with one or both of the top case 106, 306 and the bottom case 104, 304 (or the hard drive device may come into contact with the major surface absorbers) and in such an event both the corner absorbers 800, 900 and the major surface absorbers may function to restrain movement of the hard drive device and limit the impact applied thereto. The major surface absorbers 600, 700 may define a greater spring rate than the corner absorbers 800, 900 in order to protect the hard drive device from damage due to impact.

In this regard, the major surface absorbers 600, 700 are configured to distribute force applied thereto to avoid the issues noted above with respect to a diaphragm effect increasing forces applied to the center of the hard drive device 500. Accordingly, by distributing the forces across the substantially planar surfaces of the major surface absorbers 600, 700, the forces applied to the hard disk drive 500 may be reduced. Further, use of the substantially planar major surface absorbers 600, 700 may reduce the height of the mounting arrangement by avoiding use of snubbers.

In an alternate embodiment the rear case 104, 304, which is secured to the top case 106, 306 and retains the hard drive device 500 in the compartment 1006, may preload the major surface absorbers 600, 700 by compressing the major surface absorbers when secured to the top case. The preload may be employed to provide the major surface absorbers 600, 700 with an increased spring rate, which may assist in protecting the hard drive device 500 during a drop event. In one embodiment, the major surface absorbers 600, 700 may define recesses and protrusions that provide a two (or more) stage spring configuration in which the recesses are not compressed when subjected to the preload, and only act when subjected to additional force, such as during a drop event.

Further, a two stage spring configuration may still exist along the horizontal X and Y-axes. In this regard, the ridges 806, 910 may function as a first spring that remains in contact with the hard drive device 500, and the recesses 808, 912 may act as a stronger second spring that is spaced from the side walls in a neutral configuration and may only come into contact with the hard drive device during a drop event in the horizontal plane. Accordingly, the ridges 806, 910 may act as a low pass filter in the horizontal plane along the X and Y axes to resist transmitting vibrations from or to the hard drive device 500.

In some embodiments the location of the compartment 1006 may be configured to reduce the forces applied to the hard drive device 500. In this regard, as illustrated in FIGS. 5, 7 and 10, the compartment 1006 may be centered between two or more corners 1008 of the case (e.g., the top case 106, 306). By centering the compartment 1006 between two or more of the corners 1008 of the case, the hard drive device 500 received therein may avoid being subjected to secondary impacts associated with a drop event of the portable computing device. For example, when the portable computing device is dropped on one corner, an opposing corner may be subjected to impact shortly thereafter, and the secondary impact may be of equal or greater magnitude than the first impact. Thus, by centering the compartment 1006 between the corners 1008, the forces associated with impacts at the corners may not be fully transmitted to the hard drive device 500. In some embodiments the compartment 1006 may be positioned under a touch input device centered between the corners 1008.

Figure 16:
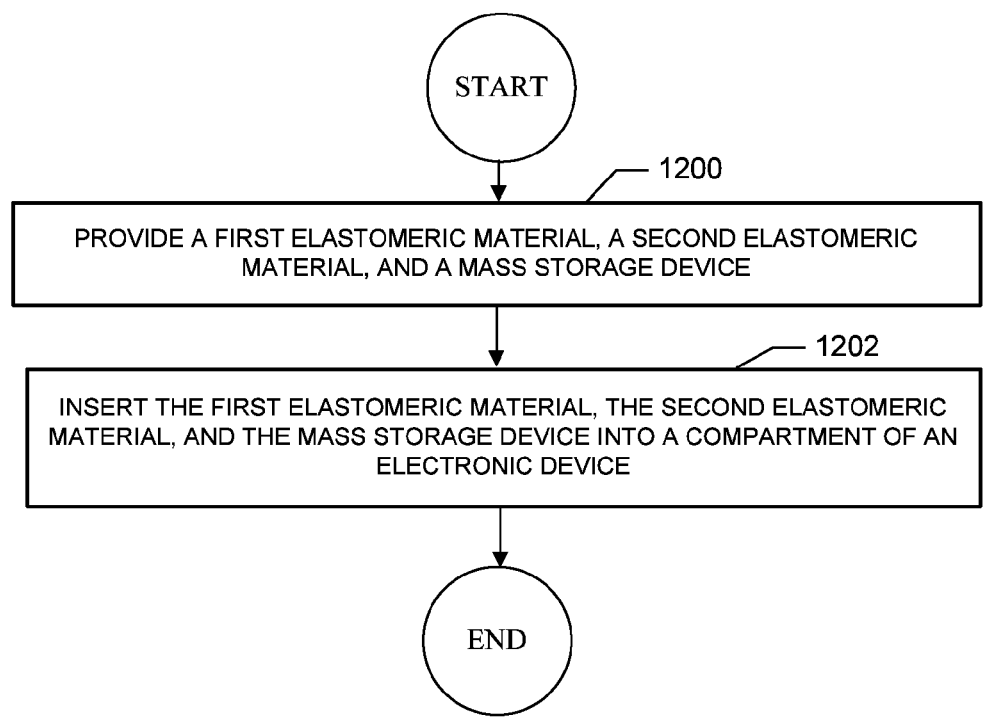
FIG. 16 schematically illustrates a method for mounting a mass storage device according to an example embodiment of the present disclosure.

A related method is also provided. As illustrated in FIG. 16, the method may include providing a first elastomeric material, a second elastomeric material, and a mass storage device, the mass storage device comprising a first major surface, a second major surface, and a plurality of edge surfaces defining a plurality of corners at operation 1200. Further, the method may include inserting the mass storage device, the first elastomeric material, and the second elastomeric material into a compartment defined by a major wall and a plurality of side walls of a case of a portable computing device with the first elastomeric material positioned between the first major surface of the mass storage device and with the major wall of the compartment and the second elastomeric material positioned between the corners of the mass storage device and the side walls of the compartment at operation 1202. Inserting the mass storage device into the compartment may comprise preloading the second elastomeric material In some embodiments the method may further comprise securing a second case to the case with the first elastomeric material between the second major surface of the mass storage device and the second case to retain the mass storage device in the compartment. Securing the second case to the case may comprise preloading the first elastomeric material. The method may additionally include adhesively coupling the second elastomeric material to the side walls of the compartment and/or mechanically coupling the second elastomeric material to the corners of the mass storage device via interference fit. The method may also include adhesively coupling the first elastomeric material to the first major surface and the second major surface.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An absorber assembly suitable for reducing a transmission of forces between a mass storage device and a device housing within which the mass storage device is disposed, the absorber assembly comprising:
a plurality of corner absorbers, each corner absorber of the plurality of corner absorbers comprising:
a wall sized to cover one of a plurality of lateral surfaces of the mass storage device,
a first end cap integrally formed with a first end of the wall and configured to surround a first corner of the mass storage device,
a second end cap integrally formed with a second end of the wall and configured to surround a second corner of the mass storage device, and
a plurality of protrusions integrally formed with and extending from the wall and configured to engage fastener openings extending through the lateral surface of the mass storage device,
wherein the plurality of corner absorbers are configured to cooperate to create an interference fit between the mass storage device and interior surfaces of the device housing.

2. The absorber assembly of claim 1, wherein the mass storage device is selected from the group consisting of a hard drive and a solid state memory device.

3. The absorber assembly of claim 1, wherein the plurality of corner absorbers comprises foam.

4. The absorber assembly of claim 1, wherein at least one of the plurality of corner absorbers comprises rubber.

5. The absorber assembly of claim 1, wherein each corner absorber of the plurality of corner absorbers comprises elastomeric material reinforced by a metal band.

6. The absorber assembly of claim 1, wherein the first end cap comprises a plurality of ridges extending perpendicularly from the wall, the plurality of ridges defining a channel having a size and shape in accordance with the first corner.

7. A portable computing device, comprising:
a case comprising a major wall and a plurality of side walls that define a compartment;
a mass storage device positioned within the compartment and comprising a first surface, a second surface opposite the first surface, a plurality of edge surfaces, and a plurality of fastener openings extending through select ones of the plurality of edge surfaces;
a plurality of elastomeric absorbers configured to protect the mass storage device from drop events and reduce the transmission of vibrations between the case and the mass storage device, the plurality of elastomeric absorbers comprising:
a major surface absorber positioned between the first surface of the mass storage device and the major wall of the case, and
a corner absorber positioned between the mass storage device and the plurality of side walls of the case, the corner absorber being configured to extend across one of the plurality of edge surfaces and surround a first corner and a second corner of the mass storage device,
wherein the major surface absorber and the corner absorber are configured to distribute and absorb a load applied to the portable computing device.

8. The portable computing device of claim 7, further comprising a second case secured to the case with a second major surface absorber positioned between the second surface of the mass storage device and the second case,
wherein the second case retains the mass storage device in the compartment.

9. The portable computing device of claim 8, wherein the second case preloads the major surface absorber.

10. The portable computing device of claim 7, wherein the mass storage device is selected from the group consisting of a hard drive and a solid state memory device.

11. The portable computing device of claim 7, wherein the corner absorber comprises:
a wall that covers one of the plurality of edge surfaces of the mass storage device;
a first end cap integrally formed with a first end of the wall and surrounding a first corner of the mass storage device;
a second end cap integrally formed with a second end of the wall and surrounding a second corner of the mass storage device; and
a plurality of protrusions extending from the wall and engaged within fastener openings that extend through the covered edge surface of the mass storage device.

12. The portable computing device of claim 7, wherein the plurality of elastomeric absorbers further comprises another corner absorber positioned on an opposite side of the mass storage device from the corner absorber.

13. The portable computing device of claim 7, wherein the corner absorber is reinforced by a metal band.

14. The portable computing device of claim 11, wherein the corner absorber comprises a plurality of ridges that define at least one recess having a shape and size in accordance with a corner of the mass storage device.

15. The portable computing device of claim 14, wherein each of the ridges contacts one of the first surface and the second surface of the mass storage device.

16. An elastomeric corner absorber suitable for protecting a mass storage device of a portable computing device, the elastomeric corner absorber comprising:
a wall having a shape and size in accordance with a lateral surface of the mass storage device, the wall being configured to be positioned between the mass storage device and an internal surface of the portable computing device;
a first end cap integrally formed with a first end of the wall;
a second end cap integrally formed with a second end of the wall; and
a plurality of protrusions extending from a central portion of the wall and configured to engage mounting openings defined by the wall of the mass storage device,
wherein the first end cap and the second end cap are configured to surround adjacent corners of the mass storage device disposed on opposing ends of the lateral surface, thereby buffering an end of the mass storage device from the internal surface of the portable computing device.

17. The elastomeric corner absorber as recited in claim 16, wherein the first end cap defines a channel having a size and shape in accordance with one of the adjacent corners of the mass storage device.

18. The elastomeric corner absorber as recited in claim 16, wherein the plurality of protrusions extend perpendicularly from the wall for insertion into the mounting openings defined by the mass storage device.

19. The elastomeric corner absorber as recited in claim 16, wherein the mounting openings comprise threaded apertures.

\* \* \* \* \*

UNITED STATES PATENT AND TRADEMARK OFFICE
CERTIFICATE OF CORRECTION

| | | |
|---|---|---|
| PATENT NO. | : 9,019,699 B2 | Page 1 of 1 |
| APPLICATION NO. | : 13/492786 | |
| DATED | : April 28, 2015 | |
| INVENTOR(S) | : Eric A. Knopf et al. | |

It is certified that error appears in the above-identified patent and that said Letters Patent is hereby corrected as shown below:

On the Title Page, Item number (54) and in the Specification, Column 1, lines 1-4: "MASS STORAGE DEVICE WITH ELASTOMERIC MATERIAL AND RELATED PORTABLE COMPUTING DEVICE AND METHOD" should read -- MASS STORAGE DEVICE WITH ELASTOMERIC MATERIAL AND RELATED PORTABLE COMPUTING DEVICE --.

Signed and Sealed this
Eighteenth Day of August, 2015

Michelle K. Lee
*Director of the United States Patent and Trademark Office*